United States Patent Office 3,557,207
Patented Jan. 19, 1971

---

3,557,207
METHOD FOR RECOVERING N,N-DIMETHYLACETAMIDE
George S. Hammond, Pasadena, Calif., assignor to E. I. du Pont de Nemours and Company, Wilmington, Del., a corporation of Delaware
No Drawing. Filed Feb. 7, 1967, Ser. No. 614,423
Int. Cl. C07c *103/34*
U.S. Cl. 260—561                                          3 Claims

ABSTRACT OF THE DISCLOSURE

Mixtures of N,N-dimethylacetamide (DMAC) and acetic acid are treated with ketene to form acetic anhydride, which is then distilled whereupon DMAC is recovered.

BACKGROUND OF THE INVENTION

N,N-dimethylacetamide is a valuable chemical product used as a solvent medium for polymerizations, in the spinning of synthetic filaments, and in other applications. It frequently is available in admixture with acetic acid; such mixture cannot be separated readily because those two compounds form an azeotrope. However, one possible way of resolving such a mixture is by azeotropic distillation, for example as is disclosed in the U.S. patent to Freure, No. 2,953,503. The added material for the azeotropic distillation in that patent may be an alkylbenzene.

SUMMARY OF THE PRESENT INVENTION

In the present invention N,N-dimethylacetamide (DMAC) is separated and recovered from its admixture with acetic acid in a two step process. First ketene ($CH_2=CO$) is added to the mixture and reacts with acetic acid to form acetic anhydride. Then the resulting mixture is distilled, the DMAC being recovered as residue or a final fraction depending on the manner of conducting the distillation. The acetic anhydride (formed in the ketene reaction) and DMAC are not known to azeotrope and accordingly distillation is a feasible and simple method of separating them, thereby avoiding the problem provided by the acetic acid-DMAC azeotrope.

At normal conditions of temperature and pressure, ketene is a gas. It may be added to the acetic acid-DMAC mixture as a gas or as a solution in a solvent medium. It is generally most convenient and economic to add the ketene as a gas immediately upon its production, for example by introducing the pyrolysis stream from acetone into the DMAC/acetic acid mixture. When the ketene is introduced into the system as a solution, it is preferred to employ acetone or DMAC as the solvent to avoid complicating the separation.

The amount of ketene used in the process can be stoichiometrically equivalent, on a molar basis, to the amount of acetic acid present, or it can be greater or less. Preferably about 30 to about 100 mole percent of ketene based on the amount of acetic acid present is used. With lesser amounts of ketene, the method of separation becomes inefficient. When amounts of ketene substantially greater than 100 mole percent are employed, excessive amounts of ketene must be recycled. In general, it becomes uneconomic to attempt to react the last few percent of acetic acid with ketene.

Ketene can be obtained by methods well known in the art. A convenient method is the pyrolysis of acetone, which is a known practice, in which ketene is generated by passing acetone into contact with a glowing filament. In using this method some acetone is customarily introduced into the system along with the ketene. In that case, distillation of acetic anhydride from the system will be preceded by removal of acetone along with any unreacted ketene which remains dissolved in the system.

The reaction of the ketene and acetic acid can conveniently be carried out in the distillation apparatus to be employed in the separation step. For example, ketene can be passed directly into a still pot containing the DMAC-acetic acid mixture. When sufficient ketene has been added, distillation can proceed. Ketene and acetic acid react at room temperature, so special conditions need not be provided.

In the invention either batch or continuous distillation practices can be followed in the separation step. Both such practices are well known and the techniques available in those arts can be used in this process. For batch operations, a combined still pot and rectifying column can be used. After charging the still with the mixture to be distilled, or with DMAC-acetic acid followed by the ketene addition, the charge is distilled to recover as distillate the acetic anhydride and the DMAC as bottoms. If the amount of ketene employed is such that not all of the acetic acid is converted to acetic anhydride, the bottoms will also contain the unreacted acetic acid. In this event a second distillation can be employed, whereupon DMAC is recovered as the overhead and the DMAC/acetic acid azeotrope as the bottoms. Continuous distillation procedures using efficient columns are preferred. In continuous operations the ketene can be introduced into a flowing stream of the acetic acid-DMAC as it passes to the distillation column.

The process of this invention is useful in recovering DMAC from both azeotropic and non-azeotropic compositions of DMAC and acetic acid. The DMAC/acetic acid azeotrope at atmospheric pressure is composed of 79 percent DMAC and 21 percent acetic acid. Thus, the invention can be employed in recovering DMAC from mixtures with acetic acid without regard to concentration. However, where either component is in considerable excess, a preliminary removal of the excess, by distillation, can be practiced before applying the present discovery, if desired.

The invention will be described further in conjunction with the following examples in which the details are given by way of illustration and are not to be construed as limiting.

EXAMPLE I

The feasibility of separating DMAC and acetic anhydride by distillation was demonstrated as follows.

A mixture of 375 grams of DMAC and 250 grams of acetic anhydride was placed in a still pot and then distilled at atmospheric pressure through a 20 x ¾ inch column packed with glass helices. Sixteen fractions were distilled and analyzed. The data obtained are:

| Sample: | Weight, g. | Percent DMAC | Percent acetic anhydride |
|---|---|---|---|
| 1 | 25.8 | 2.2 | 96.2 |
| 2 | 34.1 | 2.5 | 97.8 |
| 3 | 25.2 | 2.9 | 96.1 |
| 4 | 26.2 | 4.6 | 94.2 |
| 5 | 27.5 | 4.5 | 94.8 |
| 6 | 37.3 | 7.0 | 92.0 |
| 7 | 19.6 | 8.8 | 91.4 |
| 8 | 20.6 | 21.7 | 78.2 |
| 9 | 13.9 | 30.8 | 66.8 |
| 10 | 11.2 | 67.6 | 29.8 |
| 11 | 14.2 | 91.5 | 4.7 |
| 12 | 19.5 | 94.8 | 0.7 |
| 13 | 18.9 | 95.1 | 0.6 |
| 14 | 21.7 | 94.4 | 0.4 |
| 15 | 21.5 | 94.4 | 0.3 |
| 16 | 24.0 | 96.3 | 0.3 |
| Trap remainder in still pot * | 5.0 | 4.0 | |
| | 241.0 | 89.8 | 0.3 |
| Total | 607.2 | | |

* Also analyzed for 7.1% acetic acid.

These data show clearly that the separation can be accomplished readily.

In a similar run, a mixture of 425 grams of DMAC and 150 grams of acetic anhydride was employed. The distillation apparatus, after being flushed with dry nitrogen, was operated with a slow nitrogen bleed. Pot and vapor temperatures were recorded. For an extended period the pot temperature remained in the range of about 161° to 165° C. and the vapor temperature was about 143° to 146° C., as the first few fractions were recovered. The pure anhydride boils at 140° C. at atmospheric pressure. Then the pot temperature rose slowly to about 171° C. whereupon it rapidly rose to 190° C. During this time, the vapor temperature rose quickly to about 161° C., where it remained even through the rapid rise in the still pot temperature. DMAC boils at about 166° C. at atmospheric pressure. From these temperature data, it is evident that good separation is attained.

EXAMPLE II

Into a mixture of 100 grams of DMAC and 30 grams of acetic acid, through a gas inlet, was slowly introduced ketene, generated by pyrolysis of acetone. To generate the ketene, 250 cc. of acetone were placed in a flask surmounted with a ketene generator. The acetone was heated until it refluxed gently, and power to the coils in the ketene generator was turned on and in due course the coils became a dull red. Gas evolution started at once (found to be about 50% ketene) and it was lead into the DMAC-acetic acid mixture. This process was continued until the system (DMAC-acetic acid) increased in weight by 50 grams. The mixture was then distilled at atmospheric pressure to remove acetone and unreacted ketene, until the still pot temperature reached 158° C. At this point the mixture was analyzed and found to contain 36.9% acetic anhydride and 1.9% acetic acid.

From the foregoing run, the feasibility of the ketene-acetic acid reaction in the presence of DMAC was shown.

EXAMPLE III

Into a 2-liter flask equipped with a gas diffusion inlet and a magnetic stirrer was placed 600 grams of DMAC and 200 grams of acetic acid. Ketene, produced by pyrolysis of acetone, was passed into the mixture over a period of 16 hours until the increase in weight of the system was 169 grams. At this point the mixture was distilled through a 20 x ¾ inch column packed with glass helices. After acetone and excess ketene were removed and the still pot temperature had reached 160° C., the mixture was analyzed and found to contain 30.0% acetic anhydride and 4.9% acetic acid. Five fractions were then distilled at atmospheric pressure, as given in the following table.

| Sample | Volume, ml. | Percent acetic anhydride | Percent acetic acid |
|---|---|---|---|
| 1 | 100 | 94.0 | 1.1 |
| 2 | 71 | 89.6 | 1.9 |
| 3 | 100 | 74.9 | 1.4 |
| 4 | 61 | 34.0 | 0.9 |
| 5 | 14 | 19.4 | 1.5 |

At this point the residual liquid in the still pot was found by analysis to contain 8.0% acetic acid and essentially no acetic anhydride. The residual liquid was then distilled under vacuum; there was recovered DMAC of sufficiently high quality to use as the solvent medium for a polymerization reaction between a tetracarboxylic dianhydride and a diamine.

From the foregoing discussion and description, it is evident that the present process is an effective method of separating DMAC from its mixtures containing acetic acid. In addition, the manner of separation upgrades the acetic acid to its anhydride, which has the higher value. While the invention has been described with certain details, it will be appreciated that changes can be made therefrom without departing from its scope.

What is claimed is:

1. A process for recovering N,N-dimethylacetamide (DMAC) from mixtures of acetic acid and DMAC which comprises adding ketene to the mixture of acetic acid and DMAC whereby to convert the acetic acid in said mixture to acetic anhydride, and thereafter removing the acetic anhydride and recovering the DMAC.

2. The process of claim 1 wherein the acetic anhydride is removed by distilling said mixture of acetic acid and DMAC containing ketene whereby the intermediate acetic anhydride is removed overhead as distillate and the DMAC is recovered as bottoms.

3. A process according to claim 2 in which about 30 to 100 mole percent of ketene, based on the acetic acid, is passed into said mixture.

References Cited

FOREIGN PATENTS 237,575    10/1925    Great Britain _____ 260—546
1,055,524    4/1959    Germany.

OTHER REFERENCES

Hurd, C. D. et al., JACS 54 (3427–3431) 1932.

ALEX MAZEL, Primary Examiner
RAYMOND V. RUSH, Assistant Examiner

U.S. Cl. X.R.

260—546; 264—179

PO-1050
(5/69)

UNITED STATES PATENT OFFICE
CERTIFICATE OF CORRECTION

Patent No. 3,557,207　　　　　　　　Dated January 19, 1971

Inventor(s)　　　　　　George S. Hammond

It is certified that error appears in the above-identified patent and that said Letters Patent are hereby corrected as shown below:

Column 2, lines 69 and 70

" Trap remainder in still pot*....　　5.0　　4.0　.......
　　　　　　　　　　　　　　　　　　　　241.0　89.8　　0.3 should read

-- Trap............................　　5.0　　4.0　.......
　Remainder in still pot*.........　241.0　89.8　　0.3 -

Signed and sealed this 18th day of May 1971.

(SEAL)
Attest:

EDWARD M. FLETCHER, JR.　　　　　　WILLIAM E. SCHUYLER, JR.
Attesting Officer　　　　　　　　　Commissioner of Patents